United States Patent
Huang et al.

(10) Patent No.: US 11,538,275 B2
(45) Date of Patent: Dec. 27, 2022

(54) FINGERPRINT SENSING DEVICE AND OPERATION METHOD THEREOF

(71) Applicant: Egis Technology Inc., Taipei (TW)

(72) Inventors: Yao-Li Huang, Taipei (TW); Yu-Hsuan Lin, Taipei (TW); Chung-Yi Wang, Taipei (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/246,724

(22) Filed: May 3, 2021

(65) Prior Publication Data

US 2021/0342568 A1    Nov. 4, 2021

Related U.S. Application Data

(60) Provisional application No. 63/019,419, filed on May 3, 2020.

(30) Foreign Application Priority Data

Feb. 23, 2021   (CN) .......................... 202110204439.6

(51) Int. Cl.
*G06V 40/12*   (2022.01)
*G06F 1/3231*   (2019.01)
(Continued)

(52) U.S. Cl.
CPC ........ *G06V 40/1365* (2022.01); *G06F 1/3231* (2013.01); *G06F 3/041* (2013.01);
(Continued)

(58) Field of Classification Search
CPC ............... G06V 40/1365; G06V 40/50; G06V 40/1306; G06V 40/1318; G06V 30/1431;
(Continued)

(56) References Cited

U.S. PATENT DOCUMENTS 10,565,425 B2   2/2020 Cai
2016/0188023 A1*  6/2016 Chang ................ G06V 40/1365
345/173
(Continued)

FOREIGN PATENT DOCUMENTS

CN    109923593    6/2019
CN    110535989    12/2019
(Continued)

OTHER PUBLICATIONS

Bill Giovino, "How to Secure Microcontroller IoT Components with Fingerprint Authentication", with English translation thereof, Jun. 6, 2019, Available at: https://www.digikey.hk/zh/articles/how-to-securemicrocontroller-based-iot-devices-withfingerprint-authentication.

(Continued)

*Primary Examiner* — Premal R Patel
(74) *Attorney, Agent, or Firm* — JCIPRNET

(57) ABSTRACT

A fingerprint sensing device and an operation method thereof are provided. The fingerprint sensing device includes a driver integrated chip and a fingerprint sensor. The driver integrated chip is coupled to a host processor. The fingerprint sensor is coupled to the driver integrated chip and the host processor. The fingerprint sensor obtains a fingerprint image during a period when the host processor is in the sleep mode. The driver integrated chip performs a fingerprint verification on the fingerprint image, and the driver integrated chip determines to wake up the host processor according to whether the fingerprint image passes the fingerprint verification.

23 Claims, 3 Drawing Sheets

(51) Int. Cl.
  *G06F 3/041* (2006.01)
  *G06F 21/32* (2013.01)
  *G09G 3/20* (2006.01)
  *G06V 40/50* (2022.01)
  *G06F 21/60* (2013.01)
  *G06V 40/13* (2022.01)

(52) U.S. Cl.
  CPC .............. *G06F 21/32* (2013.01); *G06V 40/50* (2022.01); *G09G 3/20* (2013.01); *G06F 21/60* (2013.01); *G06V 40/1306* (2022.01); *G06V 40/1318* (2022.01); *G09G 2330/022* (2013.01); *G09G 2330/023* (2013.01)

(58) Field of Classification Search
  CPC ....... G06V 40/13; G06F 1/3231; G06F 3/041; G06F 21/32; G06F 21/60; G06F 2203/0338; G06F 1/3265; G06F 3/0487; G06F 3/0488; G06F 9/4418; G09G 3/20; G09G 2330/022; G09G 2330/023
  See application file for complete search history.

(56) References Cited

U.S. PATENT DOCUMENTS

| | | | |
|---|---|---|---|
| 2019/0354226 A1* | 11/2019 | Choi | G06F 3/0416 |
| 2020/0089929 A1 | 3/2020 | Riopka et al. | |
| 2021/0056333 A1* | 2/2021 | Cheng | G06V 40/28 |

FOREIGN PATENT DOCUMENTS

| | | |
|---|---|---|
| TW | 201804362 | 2/2018 |
| TW | 201820076 | 6/2018 |

OTHER PUBLICATIONS

"Office Action of Taiwan Counterpart Application", dated Feb. 22, 2022, p. 1-p. 4.

"Office Action of Taiwan Counterpart Application", dated Oct. 28, 2021, p. 1-p. 16.

* cited by examiner

FINGERPRINT SENSING DEVICE AND OPERATION METHOD THEREOF

CROSS-REFERENCE TO RELATED APPLICATION

This application claims the priority benefit of U.S. provisional application Ser. No. 63/019,419, filed on May 3, 2020, and China application serial no. 202110204439.6, filed on Feb. 23, 2021. The entirety of each of the above-mentioned patent applications is hereby incorporated by reference herein and made a part of this specification.

BACKGROUND

1. Technical Field

The disclosure relates to a sensing device, and particularly relates to a fingerprint sensing device and an operation method thereof.

2. Description of Related Art

For the current screen-unlocking application by fingerprint verification, when the mobile phone is operated in standby mode, if the user presses his finger on the fingerprint sensor to operate the mobile phone, the touch circuit or fingerprint drive circuit of the mobile phone must first notify and wake up the processor of the mobile phone. And, after waiting until the phone is fully awake, the processor then outputs a control signal to the display drive circuit to light up the display panel, and then output another control signal to the fingerprint drive circuit to operate the fingerprint sensor for fingerprint sensing. After the fingerprint sensor obtains the fingerprint image, the fingerprint drive circuit must send the fingerprint image back to the processor of the mobile phone for fingerprint verification. In other words, the current screen-unlocking method by fingerprint verification has the disadvantages of taking a lot of time and consuming the phone's power, and further causing a poor user experience. In view of this, the following will propose solutions in several embodiments.

SUMMARY

The disclosure provides a fingerprint sensing device and an operation method thereof, which provides a fast fingerprint sensing, and can quickly wake up the fingerprint sensing device and effectively save power consumption.

The fingerprint sensing device of the disclosure includes a driver integrated chip and a fingerprint sensor. The driver integrated chip is coupled to a host processor. The fingerprint sensor is coupled to the driver integrated chip and the host processor. The fingerprint sensor obtains a fingerprint image during a period when the host processor is in a sleep mode. The driver integrated chip performs a fingerprint verification on the fingerprint image and the driver integrated chip determines whether to wake up the host processor according to whether the fingerprint image passes a fingerprint verification.

The operation method of fingerprint sensing device is provided. A fingerprint sensing device includes a fingerprint sensor and a driver integrated chip. The operation method includes the following steps. The fingerprint sensor obtains a fingerprint image during a period when the host processor is in a sleep mode. The driver integrated chip performs a fingerprint verification on the fingerprint image. The driver integrated chip determines whether to wake up the host processor according to whether the fingerprint image passes the fingerprint verification.

Based on the above, in the fingerprint sensing device and the operating method thereof according to the disclosure, the fingerprint image can be verified through the driver integrated chip, and the host processor is awakened by the driver integrated chip. Therefore, according to the fingerprint sensing device and the operation method thereof of the present invention, power consumption of the host processor can be reduced.

In order to make the above description more apparent and understandable, examples of implementation are given below, together with the accompanying diagrams, which are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
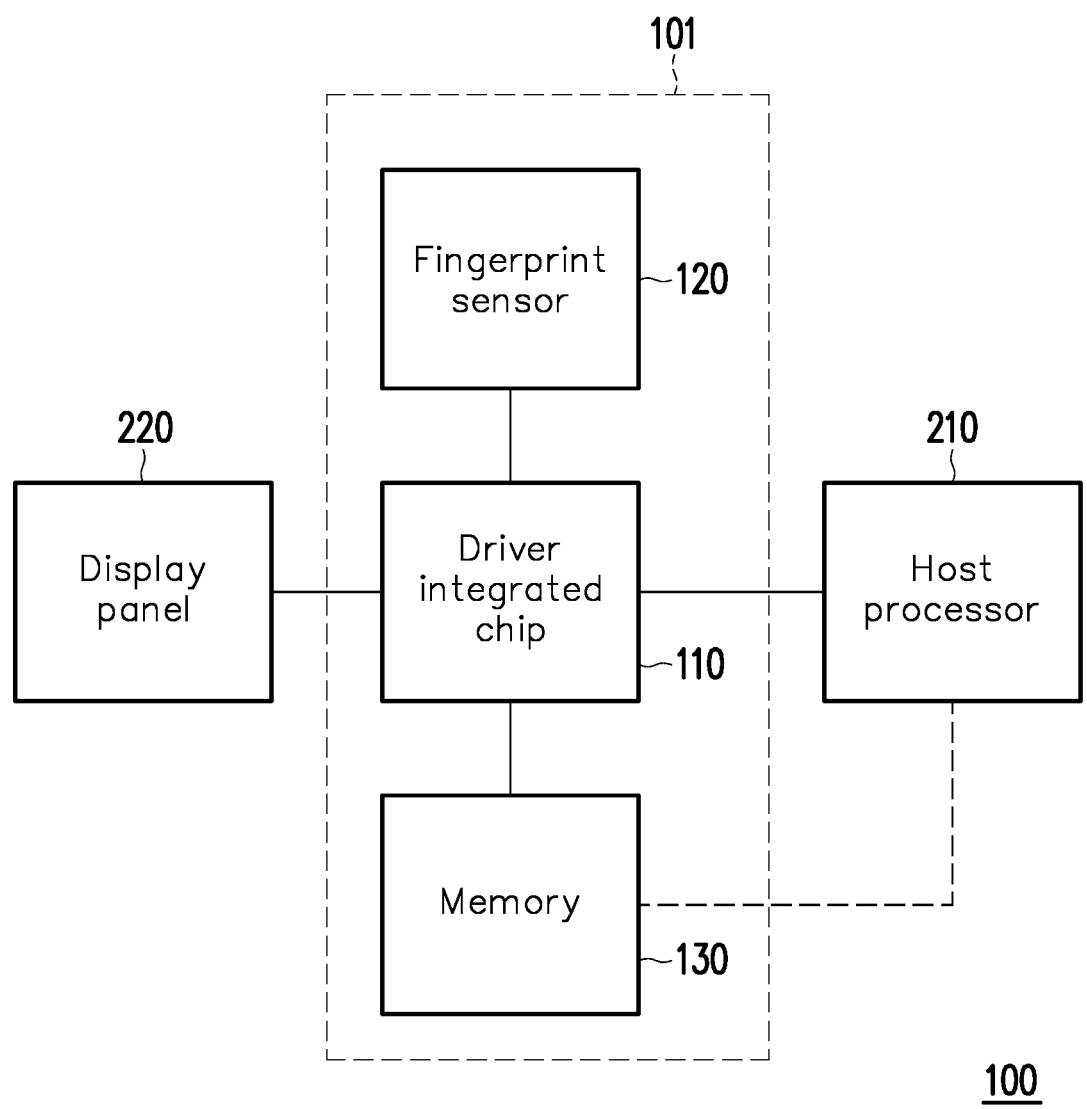
FIG. 1 is a schematic block diagram of a fingerprint sensing device according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic block diagram of a fingerprint sensing device according to an embodiment of the disclosure. Referring to FIG. 1, a fingerprint sensing device 100 includes a driver integrated chip 110, a fingerprint sensor 120, a memory 130, a host processor 210, and a display panel 220. The fingerprint sensing device 100 may be a terminal device, such as an electronic product with fingerprint sensing, such as a mobile phone, a notebook computer, a tablet computer, or a handheld smart device or the like, but the disclosure is not limited thereto.

In one embodiment, the fingerprint sensor 120 and the driver integrated chip 110 are integrated or packaged as an independent fingerprint sensor module 101, and the host processor 210 and the display panel 220 are terminal devices. The fingerprint sensor module 101 is configured in the terminal device and is connected to the host processor 210 and the display panel 220. Further, the memory 130 may be exclusively accessed by the driver integrated chip 110. Alternatively, the memory 130 is disposed in a terminal device outside the fingerprint sensor module 101, and is further coupled to the host processor 210, so as to be accessed together by the driver integrated chip 110 and the host processor 210.

In the present embodiment, the driver integrated chip 110 is coupled to the fingerprint sensor 120, the memory 130, the host processor 210, and the display panel 220. In the present embodiment, the fingerprint sensor 120 and the fingerprint sensor module 101 may be, for example, an optical fingerprint sensor, a capacitive fingerprint sensor, a thermal fingerprint sensor, or an ultrasonic fingerprint sensor. Moreover, the display panel 220 may be, for example, a liquid crystal (LCD) display panel, a light-emitting diode (LED) display panel, or an organic light emitting diode (OLED) display panel. The fingerprint sensor 120 may be disposed under the display panel 220, integrated in the display panel 220, or separately disposed under the sensor panel somewhere in the housing of the terminal device.

In the present embodiment, the driver integrated chip 110 may be a display driver integrated-circuit (DDI), a touch with display driver integrated-circuit (TDDI), a fingerprint display driver integrated-circuit (FDDI), or a fingerprint touch display driver integrated-circuit (FTDDI) so as to drive the fingerprint sensor 120 and the display panel 220. Taking the fingerprint touch display driver integrated chip (FTDDI) as an example, the driver integrated chip 110 drives the fingerprint sensor 120, the display panel 220, and the touch panel, where the touch panel may be integrated with the display panel 220 to form a touch display panel, or the touch panel may be disposed under the display panel 220. Furthermore, when the touch display panel senses a finger pressing, the driver integrated chip 110 drives the fingerprint sensor 120 to perform fingerprint sensing at a position corresponding to the finger pressing.

In the present embodiment, the driver integrated chip 110 has an image processing function and may perform fingerprint verification on a fingerprint image provided by the fingerprint sensor 120, and the memory 130 stores the fingerprint image and software for related image processing, identification, or analysis for the driver integrated chip 110 to access and execute. It is worth noting that when the host processor 210 is in a period of a sleep mode, the driver integrated chip 110 maintains the function of driving the fingerprint sensor 120, or maintains minimum operation by operating in lower power consumption, so as to drive the fingerprint sensor 120 to verify the fingerprint image.

When the fingerprint sensor 120, the display panel 220, or the touch display panel senses the fingerprint image and provides it to the driver integrated chip 110, the driver integrated chip 110 may directly perform fingerprint verification on the fingerprint image without first waking up the host processor 210, or even without sending the fingerprint image back to the host processor 210 for fingerprint verification. Moreover, when the driver integrated chip 110 determines that the fingerprint of the fingerprint image passes or fails verification, the driver integrated chip 110 may directly light up the display panel 220 without first notifying the host processor 210, and without waiting for the host processor 210 to send back a control instruction. Therefore, with the fingerprint sensing device 100 and the fingerprint sensor module 101 of the disclosure, fingerprint verification can be performed independently and quickly, and the display panel 220 or the touch display panel can also be lighted up quickly.

However, it is worth noting that the specific implementation of "lighting up" the display panel 220 in the embodiments of the disclosure refers to driving the display panel 220 to display the screen when the display panel 220 is in a completely off-screen state. Alternatively, the specific implementation of "lighting up" the display panel 220 may also refer to the display panel 220, which displays a standby screen where the standby screen may be a fully black screen or an at least partially black screen, being driven from the state having the lowest brightness so as to display the screen. In other words, with the fingerprint sensor 120 and fingerprint sensor module 101 of the disclosure, fingerprint image can be sensed and verified in the at least partially black screen or in low-light environment, without having to waking up the host processor 210, and the display panel 220 can be quickly switched from the standby screen to the operating screen.

Figure 2:
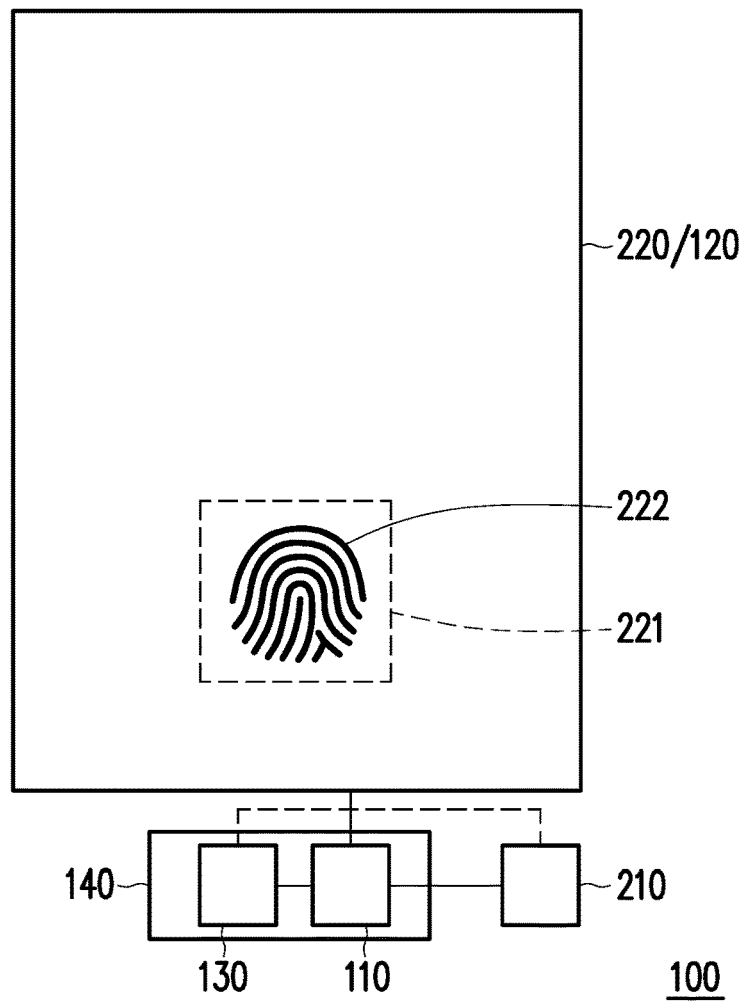
FIG. 2 is a schematic diagram of a display panel and a driver integrated chip according to an embodiment of the disclosure.
Figure 3:
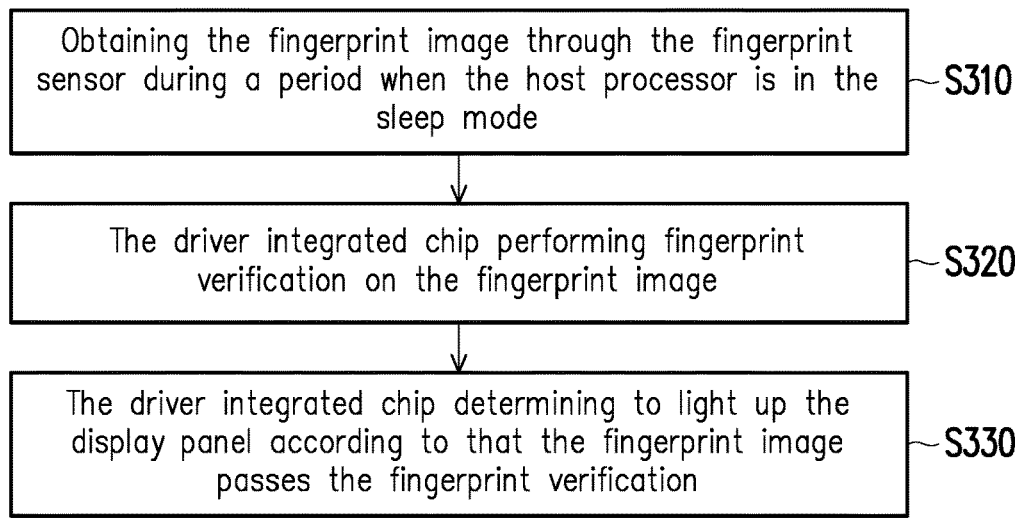
FIG. 3 is a flowchart of an operation method of fingerprint sensing device according to an embodiment of the disclosure.

FIG. 2 is a schematic diagram of a display panel and a driver integrated chip according to an embodiment of the disclosure. FIG. 3 is a flowchart of an operation method of fingerprint sensing device according to an embodiment of the disclosure. First referring to FIG. 2, the display panel 220 having the fingerprint sensor 120 is configured, where multiple sensing pixels of the fingerprint sensor 120 may be integrated in multiple display pixels of a pixel array of the display panel 220 so as to provide full-screen fingerprint sensing. In the present embodiment, the driver integrated chip 110 and the memory 130 may be provided on a same circuit board 140 (such as a printed circuit board, PCB)), and the memory 130 is configured to be exclusively accessed by the driver integrated chip 110. The driver integrated chip 110 is coupled to the fingerprint sensor 120, the display panel 220, and the host processor 210 through circuits. Moreover, the touch panel is integrated under the display panel 220.

Referring to FIGS. 1 to 3, the fingerprint sensing device 100 may perform the following steps S310 to S330. In the present embodiment, when the fingerprint sensing device 100 is in a standby state, the host processor 210 is in a sleep mode (or operates in a low power consumption mode), and the display panel 220 is in a power-saving state (that is, an unlit state). Then, when the fingerprint sensor 120 or the display panel 220 (including the touch panel) senses that the user's finger approaches, touches, or presses a finger pressing region 221 of the display panel 220, the fingerprint sensor 120 is driven to obtain a fingerprint image. In other words, the fingerprint sensor 120 or the display panel 220 (including the touch panel) may sense the finger touching and notify the driver integrated chip 110 to operate the fingerprint sensor 120 to perform fingerprint sensing on the finger pressing region 221 of the display panel 220 so as to sample the user's fingerprint 222. Further, when a finger approaches, touches, or presses on the finger pressing region 221 of the display panel 220, the driver integrated chip 110 may also drive the display panel 220 to provide part of the illuminating light to the finger pressing region 221 to illuminate the finger, while maintaining a black screen.

Of course, in other embodiments, a fingerprint sensor module 101 may be configured as the fingerprint sensor 120, a touch display panel may be configured as the display panel 220, and the fingerprint sensor module 101 may be built into the touch display panel. Accordingly, the operation mode of the display panel 220 or the touch display panel is not limited to the above, and in actual application, the operation mode can be adjusted according to the types.

Therefore, in step S310, the driver integrated chip 110 may obtain the fingerprint image through the fingerprint sensor 120 during the period when the host processor 210 is in the sleep mode. Then, in step S320, the driver integrated chip 110 may perform fingerprint verification on the fingerprint image, where the driver integrated chip 110 may read an enrolled fingerprint image pre-stored in the memory 130 or a recorded fingerprint image previously verified so as to compare whether the fingerprint image is verified. The enrolled fingerprint image may be an initial fingerprint image or at least one of the previously recorded fingerprint image; that is, the driver integrated chip 110 may automatically adjust the basis for the next verification comparison according to latest state of the enrolled fingerprint image (i.e. the most recently stored enrolled image or the updated enrolled image). In step S330, the driver integrated chip 110 may determine to light up the display panel 220 according to that the fingerprint image passes fingerprint verification, and output a wake-up signal to the host processor 210 so as to wake up the host processor 210. During the verification of the fingerprint image, the host processor 210 of the present embodiment does not receive the fingerprint image.

In other words, in the fingerprint sensing device 100, the driver integrated chip 110 directly completes the fingerprint verification process of the fingerprint image, and the current state of the display panel 220 is then determined according to the verification result of the fingerprint image, and the host processor 210 is awaken to execute the operating system. Furthermore, in the process of performing fingerprint verification, the driver integrated chip 110 does not need to return the fingerprint image to the host processor 210 for processing. Instead, the driver integrated chip 110 wakes up the host processor 210 to log in to the operating system after fingerprint verification is passed. Therefore, the fingerprint sensing device 100 and the operation method thereof according to the present embodiment can effectively reduce power consumption, quickly execute fingerprint verification procedures, and realize data security protection.

Figure 4:
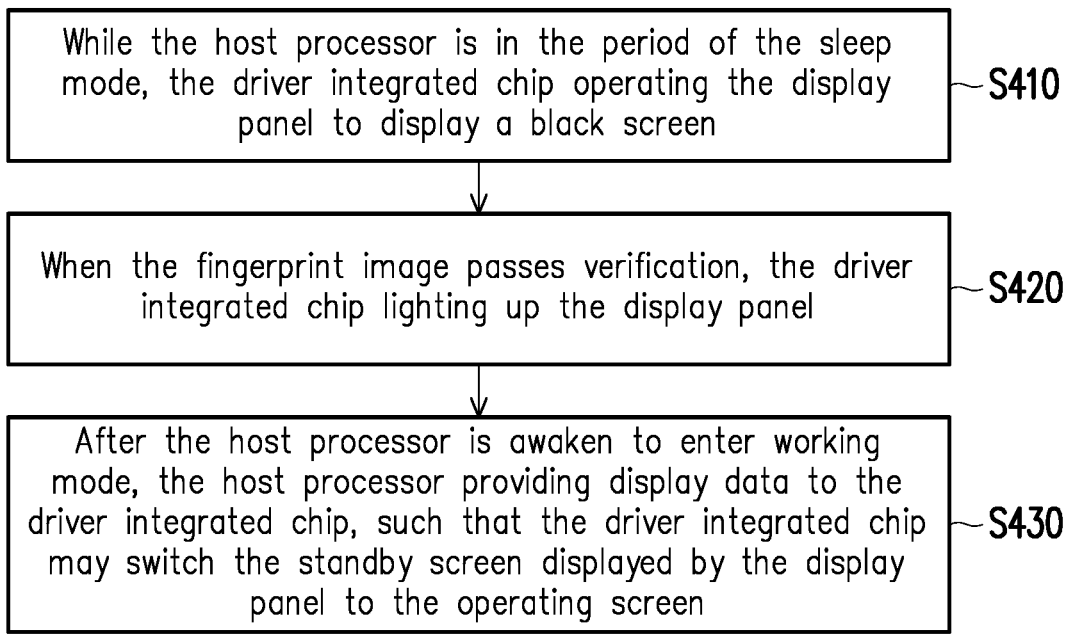
FIG. 4 is an operation flowchart of a driver integrated chip after passing fingerprint verification according to an embodiment of the disclosure.

FIG. 4 is an operation flowchart of a driver integrated chip after passing fingerprint verification according to an embodiment of the disclosure. Referring to FIGS. 1 to 4, steps S410 to S430 of FIG. 4 may be combined with the operation method of FIG. 3. When the user's finger touches or presses on the finger pressing region 221 of the display panel 220, the fingerprint sensing device 100 may perform the following steps S410 to S430. In step S410, when the host processor 210 is in the period of the sleep mode, the driver integrated chip 110 operates the display panel 220 to display a standby screen, where the standby screen is a black screen or an at least partially black screen. Then, in step S420, when the obtained fingerprint image passes verification, the driver integrated chip 110 may light up the display panel 220. The driver integrated chip 110 may simultaneously output a driving signal to the display panel 220 so as to light up the display panel 220, and output a wake-up signal and data related to fingerprint verification to the host processor 210 so as to wake up the host processor 210. Alternatively, the driver integrated chip 110 may first output a driving signal to the display panel 220, and then output a wake-up signal to the host processor 210 so as to light up the display panel 220 and wake up the host processor 210. However, in one embodiment, since the speed at which the display panel 220 is lighted up may be faster than the speed at which the host processor 210 is fully awakened, the driver integrated chip 110 may also first switch the standby screen displayed by the display panel 220 to a preset waiting screen (such as a boot screen with specific content), or maintain the standby screen displayed by the display panel 220, where the screen data of the standby screen may be pre-stored in the memory 130 without being provided by the host processor 210. Then, in step S430, after the host processor 210 is awaken to enter working mode (according to the data related to fingerprint verification), the host processor 210 may provide display data to the driver integrated chip 110, such that the driver integrated chip 110 may switch the standby screen (or the aforementioned waiting screen) displayed by the display panel 220 to an operating screen. Therefore, the fingerprint sensing device 100 of the present embodiment can provide a good user experience on fingerprint login and screen-unlocking.

Figure 5:
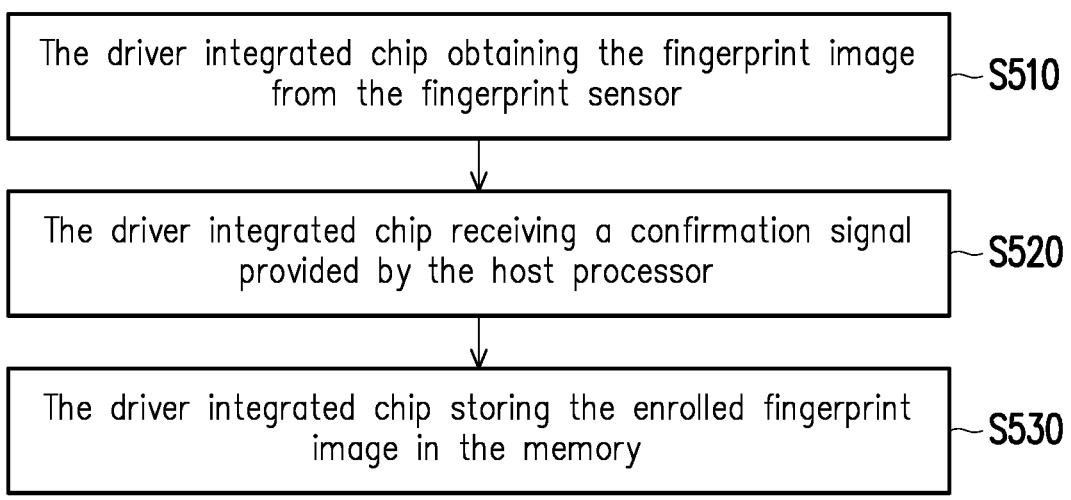
FIG. 5 is a flowchart of a fingerprint enrollment performed by a driver integrated chip according to an embodiment of the disclosure.

FIG. 5 is a flowchart of fingerprint enrollment performed by a driver integrated chip according to an embodiment of the disclosure. Referring to FIG. 1 and FIG. 5, in steps S510 to S530 of the present embodiment, the enrolled fingerprint image may be recorded into the memory 130. In step S510, when the fingerprint enrollment is performed, the driver integrated chip 110 may obtain the fingerprint image from the fingerprint sensor 120. In the present embodiment, the driver integrated chip 110 may determine whether the fingerprint feature of the fingerprint image is sufficient as an enrolled fingerprint image, and perform image optimization processing and the like on the fingerprint image. When the driver integrated chip 110 determines that the fingerprint image may be configured as an enrolled fingerprint image, the driver integrated chip 110 may notify the host processor 210. Therefore, in step S520, the driver integrated chip 110 may receive a confirmation signal provided by the host processor 210. The driver integrated chip 110 may set the fingerprint image as the enrolled fingerprint image according to the confirmation signal. Next, in step S530, the driver integrated chip 110 may store the enrolled fingerprint image in the memory 130. Therefore, in the fingerprint sensing device 100 of the present embodiment, fingerprint enrollment may be performed, and there is no need to return the fingerprint image to the host processor 210 for processing or storage the fingerprint image to other memory that is only accessed by the host processor 210. In other words, the host processor 210 of the present embodiment does not receive the enrolled fingerprint image. Therefore, the driver integrated chip 110 of the fingerprint sensing device 100 of the present embodiment provides fingerprint enrollment and saves data storage space.

On the other hand, in other embodiments, when the driver integrated chip 110 determines that the fingerprint image may be configured as the enrolled fingerprint image, the driver integrated chip 110 may also directly store the enrolled fingerprint image in the memory 130 without performing the above step S520, as a basis for the next verification and comparison of the fingerprint image.

To sum up, with the fingerprint sensing device and the operating method thereof according to the disclosure, fingerprint image can be verified through the driver integrated chip of the fingerprint sensing device during the period when the host processor is in the sleep mode, and whether to directly light up the display panel and wake up the host processor through the driver integrated chip can be determined. Moreover, with the driver integrated chip of the disclosure, there is no need to spend time returning the fingerprint image during fingerprint verification. Therefore, the fingerprint sensing device and the operation method thereof according to the disclosure can wake up the host processor quickly.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A fingerprint sensing device, comprising:
a driver integrated chip, coupled to a host processor; and a fingerprint sensor, coupled to the driver integrated chip and the host processor, and configured to obtain a fingerprint image during a period when the host processor is in a sleep mode, wherein the driver integrated chip performs a fingerprint verification on the fingerprint image and the driver integrated chip determines whether to wake up the host processor according to whether the fingerprint image passes a fingerprint verification, wherein when the host processor is not fully awakened, the driver integrated chip drives a display panel to display a standby screen, and when the host processor is fully awakened, the driver integrated chip switches the standby screen to an operating screen.

2. The fingerprint sensing device as described in claim 1, further comprising:

a memory, coupled to the driver integrated chip and storing an enrolled fingerprint image, wherein the driver integrated chip compares the fingerprint image with the enrolled fingerprint image so as to verify the fingerprint image.

3. The fingerprint sensing device as described in claim 2, wherein the memory is further coupled to the host processor.

4. The fingerprint sensing device as described in claim 2, wherein, in a fingerprint enrollment period, the driver integrated chip obtains the enrolled fingerprint image from the fingerprint sensor and stores the enrolled fingerprint image in the memory according to a confirmation signal provided by the host processor, wherein the host processor does not receive the enrolled fingerprint image; or, during the fingerprint enrollment period, the driver integrated chip obtains the enrolled fingerprint image from the fingerprint sensor and directly stores the enrolled fingerprint image in the memory;

wherein the enrolled fingerprint image is an initial fingerprint image or at least one previously recorded fingerprint image.

5. The fingerprint sensing device as described in claim 1, wherein, when the fingerprint image passes the verification or fails the verification, the driver integrated chip lights up the display panel and drives the display panel to display the standby screen.

6. The fingerprint sensing device as described in claim 5, wherein, after the host processor is awakened to enter a working mode, the host processor provides display data to the driver integrated chip, such that the driver integrated chip switches the standby screen to the operating screen.

7. The fingerprint sensing device as described in claim 5, wherein, during the period when the host processor is in the sleep mode, the standby screen is a black screen or an at least partially black screen.

8. The fingerprint sensing device as described in claim 5, wherein, when the fingerprint image passes the verification, the driver integrated chip simultaneously outputs a driving signal to the display panel and a wake-up signal to the host processor, or the driver integrated chip first outputs the driving signal to the display panel and then outputs the wake-up signal so as to the host processor to light up the display panel and wake up the host processor.

9. The fingerprint sensing device as described in claim 5, wherein the fingerprint sensor or the display panel senses a finger approaching, touching, or pressing on the display panel and drives the fingerprint sensor to obtain the fingerprint image.

10. The fingerprint sensing device as described in claim 1, wherein, the fingerprint sensor is an optical fingerprint sensor, a capacitive fingerprint sensor, a thermal fingerprint sensor, or an ultrasonic fingerprint sensor, and wherein the driver integrated chip is a display driver integrated-circuit (DDI), a touch with display driver integrated-circuit (TDDI), a fingerprint display driver integrated-circuit (FDDI), or a fingerprint touch display driver integrated-circuit (FTDDI).

11. The fingerprint sensing device as described in claim 1, wherein the fingerprint sensor and the driver integrated chip are integrated or packaged as a fingerprint sensor module.

12. An operation method of fingerprint sensing device, wherein the fingerprint sensing device comprises a fingerprint sensor and a driver integrated chip, wherein the operation method comprises:

obtaining, through the fingerprint sensor, a fingerprint image during a period when a host processor is in a sleep mode;

performing, through the driver integrated chip, a fingerprint verification on the fingerprint image;

determining, through the driver integrated chip, whether to wake up the host processor according to whether the fingerprint image passes the fingerprint verification, when the host processor is not fully awakened, driving, through the driver integrated chip, a display panel to display a standby screen; and when the host processor is fully awakened, switching, through the driver integrated chip, the standby screen to an operating screen.

13. The operation method as described in claim 12, wherein a step of performing the fingerprint verification on the fingerprint image through the driver integrated chip comprises:

accessing, through the driver integrated chip, a memory storing an enrolled fingerprint image; and comparing, through the driver integrated chip, the fingerprint image with the enrolled fingerprint image so as to verify the fingerprint image.

14. The operation method as described in claim 13, wherein the memory is further coupled to the host processor.

15. The operation method as described in claim 13, further comprising:

obtaining, through the driver integrated chip the enrolled fingerprint image from the fingerprint sensor during a fingerprint enrollment period;

storing, through the driver integrated chip, the enrolled fingerprint image in the memory according to a confirmation signal provided by the host processor during the fingerprint enrollment period, wherein the host processor does not receive the enrolled fingerprint image;

wherein the enrolled fingerprint image is an initial fingerprint image or at least one previously recorded fingerprint image.

16. The operation method as described in claim 13, further comprising:

obtaining, through the driver integrated chip, the enrolled fingerprint image from the fingerprint sensor during a fingerprint enrollment period; and directly storing, through the driver integrated chip, the enrolled fingerprint image in the memory;

wherein the enrolled fingerprint image is an initial fingerprint image or at least one previously recorded fingerprint image.

17. The operation method as described in claim 12, further comprising:

illuminating, through the driver integrated chip, the display panel and driving the display panel so as to display the standby screen when the fingerprint image passes the verification.

18. The operation method as described in claim 17, further comprising:

providing, through the host processor, display data to the driver integrated chip after the host processor is awakened to enter a working mode, such that the driver integrated chip switches the standby screen to the operating screen.

19. The operation method as described in claim 17, wherein, during the period when the host processor is in the sleep mode, the standby screen is a black screen or an at least partially black screen.

20. The operation method as described in claim 17, further comprising:

simultaneously outputting, through the driver integrated chip, a driving signal to the display panel and a wake-up signal to the host processor when the fingerprint image passes the verification, or first outputting the driving signal to the display panel and then outputting the wake-up signal to the host processor so as to light up the display panel and wake up the host processor.

21. The operation method as described in claim 17, further comprising:

sensing, through the fingerprint sensor or the display panel, a finger approaching, touching, or pressing on the display panel and driving the fingerprint sensor so as to obtain the fingerprint image.

22. The operation method as described in claim 12, wherein, the fingerprint sensor is an optical fingerprint sensor, a capacitive fingerprint sensor, a thermal fingerprint sensor, or an ultrasonic fingerprint sensor, and wherein the driver integrated chip is a display driver integrated-circuit (DDI), a touch with display driver integrated-circuit (TDDI), a fingerprint display driver integrated-circuit (FDDI), or a fingerprint touch display driver integrated-circuit (FTDDI).

23. The operation method as described in claim 12, wherein the fingerprint sensor and the driver integrated chip are integrated or packaged as a fingerprint sensor module.

\* \* \* \* \*